United States Patent
Miyashiro

(10) Patent No.: US 6,860,353 B2
(45) Date of Patent: Mar. 1, 2005

(54) MOTORCYCLE REAR SUSPENSION SWINGARM ASSEMBLY

(75) Inventor: Shidehiko Miyashiro, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/178,311

(22) Filed: Jun. 20, 2002

(65) Prior Publication Data

US 2003/0010557 A1 Jan. 16, 2003

(30) Foreign Application Priority Data

Jun. 20, 2001 (JP) ........................................ 2001-185807

(51) Int. Cl.⁷ ............................................. B62D 61/02
(52) U.S. Cl. ...................................... 180/227; 180/219
(58) Field of Search ................................ 180/227, 219; 280/284–286, 288

(56) References Cited

U.S. PATENT DOCUMENTS

| | | | | |
|---|---|---|---|---|
| 4,809,802 A | * | 3/1989 | Seino et al. ................. | 180/231 |
| 4,887,687 A | * | 12/1989 | Asai et al. ................... | 180/219 |
| 4,889,205 A | * | 12/1989 | Yoshimi ..................... | 180/227 |
| 5,361,864 A | | 11/1994 | Tanaka ........................ | 180/219 |
| 5,782,313 A | | 7/1998 | Kurawaki et al. ........... | 180/219 |
| 5,918,695 A | | 7/1999 | Matsuura et al. ............ | 180/226 |
| 6,182,994 B1 | * | 2/2001 | Gogo et al. ................. | 280/284 |
| 6,206,398 B1 | * | 3/2001 | Yanai et al. ................. | 280/284 |
| 6,315,071 B1 | * | 11/2001 | Gogo .......................... | 180/219 |
| 6,427,796 B1 | * | 8/2002 | Tsutsumikoshi ............ | 180/227 |
| 6,446,748 B1 | | 9/2002 | Suzuki ........................ | 180/350 |
| 6,481,523 B1 | * | 11/2002 | Noro et al. .................. | 180/227 |
| 6,508,326 B2 | * | 1/2003 | Kido et al. .................. | 180/226 |
| 6,516,910 B2 | * | 2/2003 | Buell et al. ................. | 180/219 |

* cited by examiner

*Primary Examiner*—Lesley D. Morris
*Assistant Examiner*—L. Lum
(74) *Attorney, Agent, or Firm*—Knobbe, Martens, Olson & Bear, LLP

(57) ABSTRACT

An off-road motorcycle incorporating a swingarm assembly for pivotally supporting a rear wheel relative to a main frame portion of the motorcycle. Preferably, the swingarm includes right and left arms extending rearwardly from a forward connecting portion. Right and left rear wheel mount members are secured to the right and left arms, respectively, to rotatably support the rear wheel of the motorcycle. Preferably, the arms from the swingarm assembly are formed at least partially by a hydroforming process wherein the center of the arms has a width that is greater than the width of either a forward or rearward end of the arm. In addition, the forward ends of each of the right end left arms are bent inward such that the forward portion of the swingarm assembly is narrower than the rear portion of the swingarm assembly. Desirably, the hydroforming process permits the inner wall of the arms to be vertical and substantially planar, even along the region where the arms are bent. In addition, a vibration absorbing coating is applied to the wheel support members in a manner to be interposed between an inner surface of the wheel support members and the outermost portion of a hub of the rear wheel.

23 Claims, 19 Drawing Sheets

MOTORCYCLE REAR SUSPENSION SWINGARM ASSEMBLY

PRIORITY INFORMATION

This application is related to, and claims priority from, Japanese Patent Application No. 2001-185807, filed on Jun. 20, 2001, the entirety of which is incorporated by reference herein.

BACKGROUND OF THE INVENTION

1. Field of the Invention

This invention relates generally to vehicle suspension systems. More particularly, this invention relates to a rear suspension swingarm assembly for supporting a rear wheel of the motorcycle.

2. Description of the Related Art

Motorcycles generally include an engine supported within a cradle-type frame assembly. A typical arrangement includes a front suspension fork assembly supported by the frame for rotation about a steering axis. The fork assembly supports a front wheel of the motorcycle at its lower end. A handlebar assembly is mounted to the suspension fork to permit steering of the front wheel of the motorcycle. An elongated, straddle-type seat assembly is typically supported above the frame. A rear wheel of the motorcycle is commonly supported by a suspension swingarm assembly, which is pivotally supported by, and extends in a rearward direction from, a lower portion of the frame. Thus, both the front and rear wheels are typically suspended for limited, controlled movement along a suspension travel path relative to the frame.

A common swingarm assembly includes a connecting portion, which is typically connected to the motorcycle frame and to which one end of a suspension member, such as a hydraulic shock absorber, is mounted. One or more tubular arms typically extend in a rearward direction from the connecting portion. A rear wheel of the motorcycle is often supported at a rearward end of the arm(s).

In a common arrangement, a hub assembly of the rear wheel is rotatably supported on a shaft, or axle, which is carried by the swingarm assembly. An intermediate member, such as a washer, for example, may be positioned between the hub and an inner surface of the swingarm assembly. A nut is often threaded on one end of the axle and tightened to secure the hub on the axle and to press the hub (and washer, if provided) firmly against the inner surface of the swingarm.

However, vibrations transmitted from the engine, along with forces imparted on the rear wheel when traversing rough terrain, nonetheless result in a slight amount of relative movement between the hub, or washer, and the swingarm. The friction produced from this relative movement tends to wear the inner surface of the swingarm assembly. Over time, such wear may compromise the strength or stiffness of the swingarm assembly. Accordingly, this region of the swingarm assembly may be enlarged to compensate for the impending wear. The size increase, however, disadvantageously adds weight to the assembly.

SUMMARY OF THE INVENTION

Accordingly, a preferred embodiment inhibits wear of the inner surface of the swingarm assembly caused by relative movement between the hub assembly (including any intermediate members) and the swingarm assembly. In one arrangement, a vibration absorbing coating is applied to at least a portion of the swingarm assembly that may come into contact with the hub assembly or any intermediate component placed therebetween. In another arrangement, a rear wheel support member is affixed to a rearward end of each of the one or more arms of the swingarm assembly. At least a portion of the inner surface of the wheel support member(s) that may come into contact with the hub assembly or any intermediate component placed therebetween includes a coating of a vibration absorbing material. In some arrangements, the entire wheel support member(s), or even the entire swingarm assembly, may be coated with a vibration absorbing material.

One aspect of the present invention involves an off-road motorcycle comprising a frame. A front suspension assembly is rotatably supported by the frame and rotatably supports a front wheel. A rear swingarm assembly is pivotably supported by the frame and rotatably supports a rear wheel. An internal combustion engine is supported by the frame and is configured to drive the rear wheel. The swingarm assembly includes at least one elongated, tubular arm extending along a side of the rear wheel in a direction substantially aligned with a vertical, central plane of the motorcycle. The arm has a rearward end portion arranged to receive an axle configured to support a hub assembly of the rear wheel. The end portion has an inner surface facing the hub assembly. The inner surface has a first portion and a second portion defining a contact surface arranged to contact a portion of the hub assembly. The second portion is spaced from the first portion toward the hub assembly to define a thickened area of the end portion.

Another aspect of the present invention involves an off-road motorcycle comprising a frame and a front suspension assembly rotatably supported by the frame. The front suspension assembly rotatably supports a front wheel. A rear swingarm assembly is pivotably supported by the frame and rotatably supports a rear wheel. An internal combustion engine is supported by the frame and is configured to drive the rear wheel. The swingarm assembly comprises at least one elongated, tubular arm extending along a side of the rear wheel in a direction substantially aligned with a vertical, central plane of the motorcycle. The arm has a rearward end portion arranged to receive an axle configured to support a hub assembly of the rear wheel. The end portion has an inner surface facing the hub assembly, wherein a portion of the inner surface contacting the hub comprises a lubricious layer.

Still another aspect of the present invention involves a rear suspension swingarm assembly for an off-road motorcycle. The swingarm assembly is configured to be pivotably supported by a frame of the motorcycle and rotatably support a rear wheel of the motorcycle. The swingarm assembly includes a connecting portion defining a pivot axis of the swingarm assembly relative to the frame of the motorcycle. In addition, the swingarm assembly includes a first elongated, tubular arm and a second elongated, tubular arm. Each of the first and second arms is fixed to the connecting portion and extend along a side of the rear wheel. Each of the arms has a rearward end portion arranged to receive an axle configured to support a hub assembly of the rear wheel. The end portion has an inner surface facing the hub assembly and having a thickened portion extending toward the hub assembly.

A further aspect of the present invention involves a rear suspension swingarm assembly for an off-road motorcycle. The swingarm assembly is configured to be pivotably supported by a frame of the motorcycle and rotatably support a rear wheel of the motorcycle. The swingarm assembly includes a connecting portion defining a pivot axis of the swingarm assembly relative to the frame of the motorcycle. The swingarm assembly additionally includes a first elongated, tubular arm and a second elongated, tubular arm. The first and second arms are fixed to the connecting portion and extend along a side of the rear wheel. Each of the arms has a rearward end portion arranged to receive an axle configured to support a hub assembly of the rear wheel. The end portion has an inner surface facing the hub assembly, wherein a portion of the inner surface contacting the hub comprises a vibration absorbing coating.

BRIEF DESCRIPTION OF THE DRAWINGS

These and other features, aspects and advantages of the present invention will be described with reference to drawings of a preferred embodiment, which is intended to illustrate, and not to limit, the present invention. The drawings comprise 19 figures.

FIG. 5a is a view of a left-side access member taken along the view line 5a—5a of FIG. 5 and FIG. 5b is a view of a right-side access member taken along the view line 5b—5b of FIG. 5.

DETAILED DESCRIPTION OF THE PREFERRED EMBODIMENT

Figure 1:
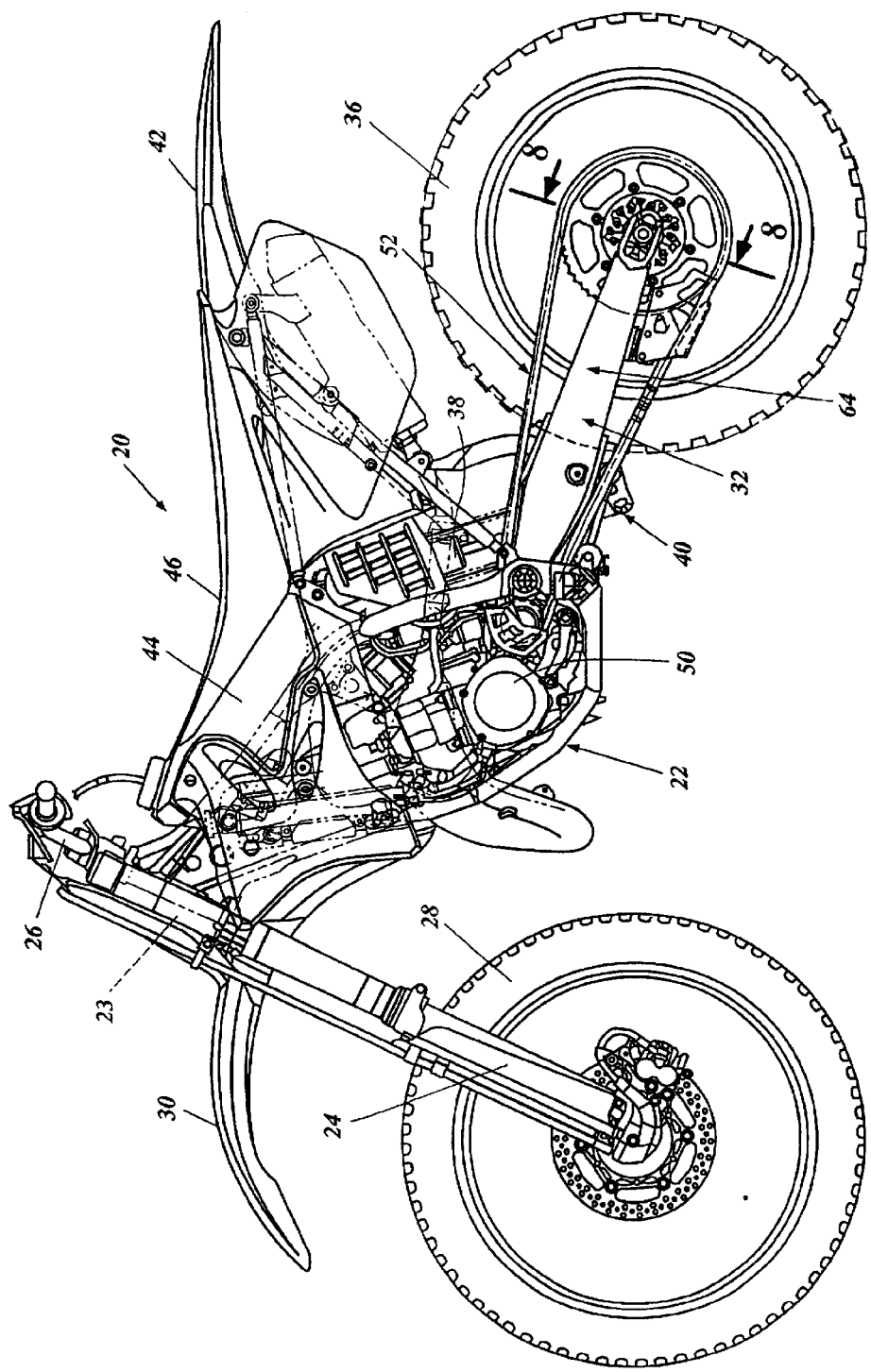
FIG. 1 is a side elevational view of an off-road motorcycle incorporating a preferred rear suspension swingarm assembly that is connected to a frame.

With reference to FIG. 1, an off-road motorcycle incorporating a preferred rear suspension swingarm assembly is identified generally by the reference numeral 20. The motorcycle 20 includes a frame assembly 22 that is formed primarily from tubular members, which may have circular or other suitable cross-sectional configurations.

The frame assembly includes a head pipe 23. A front suspension fork assembly 24 is journaled for rotation with respect to the frame assembly 22. In particular, the front suspension fork assembly extends through the head pipe 23 of the frame assembly 22. A handlebar assembly 26 is carried at an upper end of the front fork assembly 24 and can be used to steer a front wheel 28, which is rotatably journaled at a lower end of the fork assembly 24 in any suitable manner. The front fork assembly 24 also supports a front fender 30 at a position above the front wheel 28. The front fender 30 is arranged to deflect dirt, mud or other debris that may be thrown upward by the front wheel 28.

A lower, rearward portion of the frame assembly 22 pivotally supports a rear swingarm assembly 32. The swingarm 32 supports a rear wheel 36 of the motorcycle 20 at its rearward end. Preferably, the swingarm 32 is formed of aluminum or a similar alloy such that the overall weight of the swingarm can be reduced. In addition, as will be explained below, the swingarm 32 is designed to further reduce the overall weight of the swingarm.

A rear shock absorber 38 is operably connected between the frame assembly 22 and the rear swingarm assembly 32. Preferably, the rear shock 38 is connected to the swingarm 32 through a linkage arrangement 40, as is described in greater detail below. Thus, the rear shock absorber 38 provides resistance to articulating (i.e., pivotal) movement of the swingarm assembly 32 and the rear wheel 36. The linkage assembly 40 may be utilized to alter a leverage ratio between the rear wheel 36 and the shock absorber 38. In an alternative arrangement, the shock absorber 38 may be connected directly to the swingarm 32 and the linkage assembly 40 can be omitted.

The frame 22 also supports a rear fender 42 at a position above the rear wheel 26. The rear fender 42 is arranged to deflect mud, dirt or other objects that may be thrown in an upward direction by the rear wheel 36.

The frame assembly 22 supports a fuel tank 44 in a position generally behind and below the handle bar assembly 26. Desirably, the fuel tank 44 surrounds and extends below at least a portion of the frame assembly 22, which somewhat lowers the center of gravity of the motorcycle 20.

A straddle-type seat assembly 46 extends between the fuel tank 44 and the rear fender 42. Desirably, the seat assembly 46 has a relatively flat upper surface, which advantageously permits a rider of the motorcycle 20 to move relatively freely between various positions along the length of the seat assembly 46. Such operator movement is greatly desired during off-road operation of the motorcycle 20, for instance.

The frame assembly 22 also supports an internal combustion engine 50. In the illustrated arrangement, the frame assembly 22 forms a cradle-like structure in which the engine 50 is supported. Preferably, the engine 50 is positioned below the fuel tank 44 and seat assembly 46 to provide the motorcycle 20 with a relatively low center of gravity, which improves the handling characteristics of the motorcycle 20.

The illustrated engine 50 operates on a two-stroke, crankcase compression principle and is of a single cylinder arrangement. However, other suitable engine arrangements may also be used, such as a multi-cylinder arrangement or an engine configuration that operates on other operating principles, such as a four-stroke engine, for example.

Preferably, a chain and sprocket drive assembly 52 extends between the engine 50 and the rear wheel 36 and is configured to transfer torque produced by the engine 50 to the rear wheel 36. The chain, thus, transfers power from the engine 50 to the rear wheel 36 to propel the motorcycle 20 in a manner well known in the art. Although a chain and sprocket type drive assembly 52 is illustrated, other suitable types of drive arrangements may also be used, such as a belt drive or shaft drive arrangement, for example.

Figure 2:
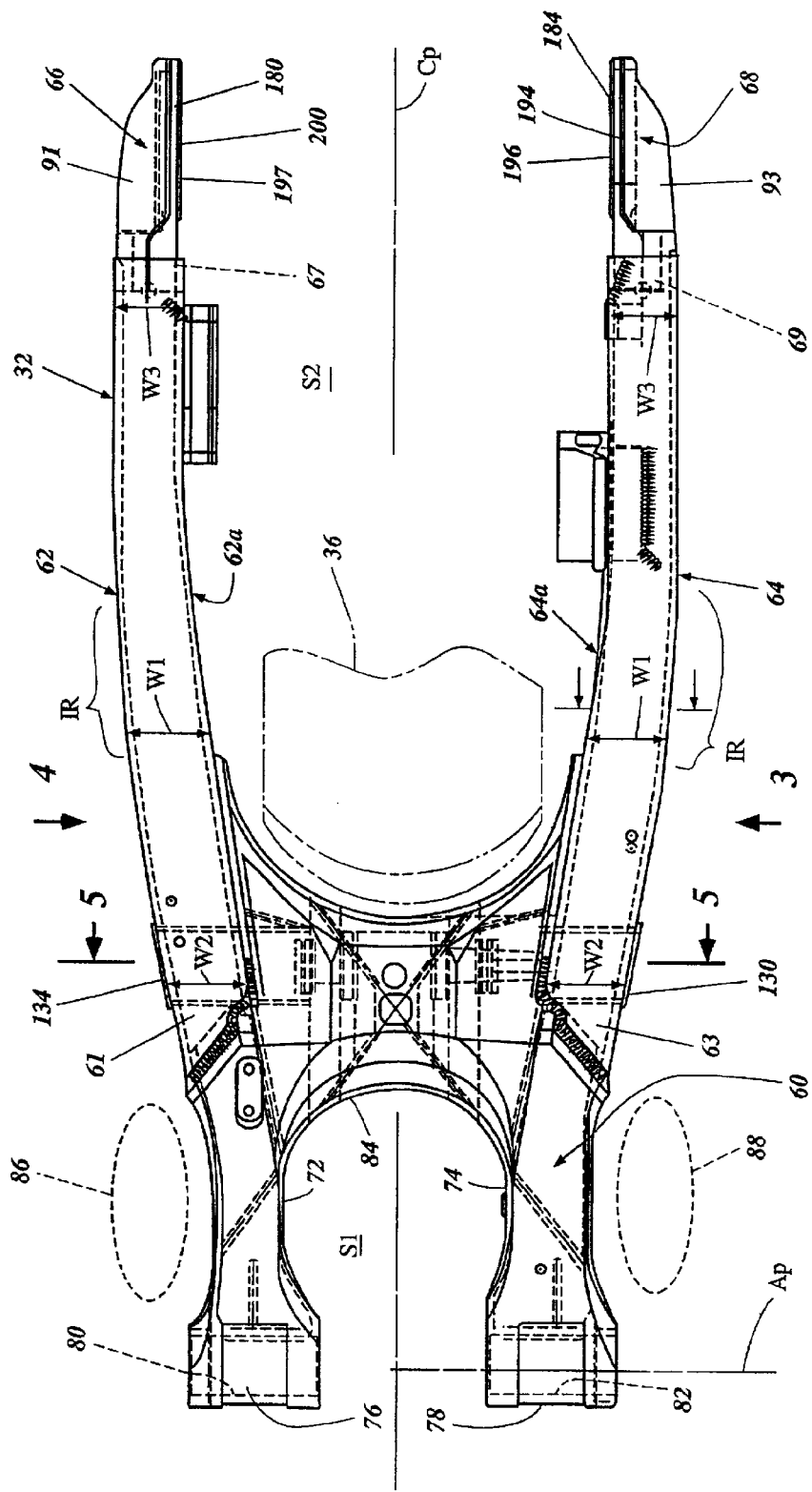
FIG. 2 is a top plan view of the rear suspension swingarm assembly of FIG. 1. The swingarm assembly includes a forward connecting portion, right and left arms extending rearwardly from the connecting portion and right and left wheel mount members fixed to rearward ends of the arms.

With reference to FIG. 2, the rear swingarm assembly 32 is illustrated with certain components of the motorcycle 20 removed for clarity. Desirably, the rear swingarm assembly 32 is generally in the shape of the letter "H" in top plan view and defines a forward space S1 to accommodate a portion of the rear shock absorber 38 and a rearward space S2 to accommodate the rear wheel 36 of the motorcycle 20. In some applications, the forward space S1 can be omitted and the shock absorber 38 will not extend below the swingarm assembly 32; however, by allowing the shock absorber 38 to connect at a location under the swingarm assembly 32, the travel of the rear swingarm assembly 32 can be increased, which is very desirable in off-road applications.

As described above, a forward end of the swingarm assembly 32 is configured to be pivotally connected to the frame assembly 22 of the motorcycle 20 and a rearward end of the swingarm assembly 32 is configured to rotatably support the rear wheel 36. Desirably, the rear swingarm assembly 32 is substantially symmetrical about a vertical, central plane CP, which passes through the length of the motorcycle 20. Other arrangements of the swingarm assembly 32 are also possible. For example, the swingarm assembly 32 may be single-sided, i.e., extend along only one side of the rear wheel; however, the substantially symmetrical design provides better handling and balance to the motorcycle, which is used in off-road applications.

The illustrated swingarm assembly 32 includes a forward connecting portion 60, which serves to connect the swingarm assembly to the frame assembly 22 of the motorcycle 20. Preferably, a forward portion 61 of the right arm 62 and a forward portion 63 of the left arm 64 are secured to the connecting portion 60. More preferably, the forward portions 61, 63 are welded to the connecting portion 60. The welded connection helps reinforce the arms 62, 64 in a forward portion of the arms 62, 64.

In the illustrated arrangement, the forward portions 61, 63 and the connection portion extend alongside each other and the top and bottom are welded together along a seam that is defined by the two longitudinal surface that are placed in abutment. Other suitable techniques also can be used to secure the components together. Advantageously, the forward portions 61, 63 are disposed generally forward of a forwardmost portion of the rear wheel 36. Such a placement facilitates attachment location between the arms 62, 64 and the connecting portion 60.

The right arm 62 and the left arm 64 preferably extend rearwardly from the connecting portion 60 on opposing sides of the central plane CP. When viewed from the rear of the motorcycle 20, the right arm 62 is positioned on the right side of the central plane CP and the left side arm 64 is positioned on the left side of the central plane CP. In some applications, a single side arm can be used instead of the generally parallel arms 62, 64 and the single side arm can extend from the frame and alongside the rear wheel 36.

The arms 62, 64 preferably are formed in a unitary structure. In other words, the arms 62, 64 preferably are not cut, or generally machined such that the cross-section of the arms 62, 64 desirably are not changed by cutting, machining or welding. More preferably, the arms 62, 64 have a generally rectangular tubular shape that is formed through hydroforming, which will be described below. Even more preferably, the arms 62, 64 are formed by hydroforming an elliptical or oval shaped tube. While other constructions are possible, as discussed above in the Summary of the Invention, the unitary construction advantageously improves the structural integrity of the arms 62, 64.

A right wheel support member 66 is connected to the rearward end of the right arm 62 and a left wheel support member 68 is connected to the rearward end of the left arm 64. Preferably, the right and left wheel support members are formed by a forging technique to produce a rigid and strong component. The right and left wheel support members 66, 68 cooperate to support an axle 70 (FIG. 8), which, in turn, supports a hub of the rear wheel 36 of the motorcycle 20. The axle 70 preferably comprises a head at one end and a nut 71 at the other end. In the illustrated arrangement, a forward portion 67 of the right wheel support member 66 is inserted into the generally open rear face of the right arm 62 and welded therein. Similarly, a forward portion 69 of the left wheel support member 68 is inserted into the generally open rear face of the left arm 64 and welded therein.

Right and left extensions 72, 74 of the forward connecting portion 60 extend in a direction substantially parallel to the center plane CP along opposing sides of the forward space S1 and terminate in right and left mounting portions 76, 78, respectively. The extensions 72, 74 desirably are arcuate in top plan view (see FIG. 2). The arcuate design helps reduce stress risers and improves the structural integrity of the rear swingarm assembly 32.

The right and left mounting portions 76, 78 each include a cylindrical aperture 80, 82, respectively, extending in a direction substantially normal to the central plane CP. Centerlines of the apertures 80, 82 are aligned and cooperate to define a pivot axis AP of the swingarm assembly 32. The apertures 80, 82 are configured to receive a support shaft, which connects the swingarm assembly 32 to the frame 22, as is described in greater detail below.

A bridge portion 84 of the forward connecting portion 60 extends between the right and left arms 72, 74 and, desirably between forward end portions of the right arm 62 and the left arm 64 of the swingarm assembly 32. The bridge preferably is arcuate in top plan view such that stress risers can be reduced and the strength of the bridge portion can be improved. Desirably, the bridge portion 84, right and left arms 72, 74 and right and left mounting portions 76, 78 are formed from a unitary piece of material such that the forward connecting portion 60 is one continuous piece. Preferably, the forward connecting portion 60 is cast from an aluminum alloy, however, other suitable methods of manufacturing and materials may also be used.

The bridge portion 84 advantageously connects the right and left portions of the swingarm assembly 32 in an intermediate position along the total length of the swingarm assembly 32, thereby improving the structural integrity of the rear swingarm assembly 32. In a preferred arrangement, the arms 62, 64 are welded to the connecting portion 60. In some less advantageous arrangements, the arms 62, 64 are formed integrally with the right and left arms 72, 74 respectively and the right and left mounting portions 76, 78 respectively, with the bridge 84 being welded between the two portions.

As illustrated in FIG. 2, the extensions 72, 74 of the forward connecting portion 60 are closer to one another, in a direction normal to the center plane CP, than at least the rearward ends of the arms 62, 64. In other words, the forward end of the swingarm assembly 32 is narrower than a rearward portion of the swingarm assembly 32. In addition, the outer walls of the extensions 72, 74 are concave which defines right and left clearance spaces 86, 88 on outboard sides of the right and left arms 72, 74 of the forward connecting portion 60. These spaces 86, 88 advantageously provide extra clearance for the heels of a rider of the motorcycle 20 or provide space for other components of the motorcycle 20 to be positioned. These spaces 86, 88 also are advantageously positioned at a location along the swingarm assembly 32 that is reinforced by the bridge portion 84 and that is subjected to relatively lower loading due to its proximity to the pivot axis AP. In one arrangement, a master cylinder of a rear brake assembly (not shown) may be positioned in the space 86. Other components also can be disposed within this region.

In order to place the extensions 72, 74 closer to each other relative to rearward portions of the arms 62, 64, both the right and left arms 62, 64 are bent at an intermediate location, or region IR, between the forward and rearward ends of the arms 62, 64 such that the forward ends of the arms 62, 64 are located further inward than the rearward ends in the assembled swingarm 32. Although the illustrated bend, and the associated intermediate region IR, is located at approximately a central portion along the length of the arms 62, 64, in other arrangements the location of the bends may be varied. For example, the bend may be located to create clearance for a specific type or size of rear wheel 36.

Preferably, an inner, vertical surface 62a, 64a of the arms 62, 64 that is located at the bend, or within the intermediate region IR, is substantially planar. That is, the surfaces 62a, 64a (see FIGS. 2 and 9) preferably do not bow in or out. More preferably, the surfaces 62a, 64a also are substantially vertical. As a result, the strength and stiffness of the arms 62, 64 is improved, thus permitting the wall thickness of the arms 62, 64 to be minimized, resulting in a low overall weight. The forming of the inner surfaces 62a, 64a is described in greater detail below.

The swingarm assembly 32 in general and, specifically, the right and left arms 62, 64 are advantageously sized and shaped to provide the desired strength and stiffness in order to achieve desirable handling characteristics of the motorcycle 20, while keeping the weight advantageously low. Preferably, the right and left arms 62, 64 define a first width, in a direction generally normal to the central plane CP, within the intermediate region IR. Preferably, the width W1 is greater than a width W2 of the arms 62, 64 at a forward end and is also greater than the width W3 of the arms 62, 64 at a rearward end. As described in greater detail below, such an arrangement optimizes the strength-to-weight ratio of the swingarm assembly 32.

Figure 3:
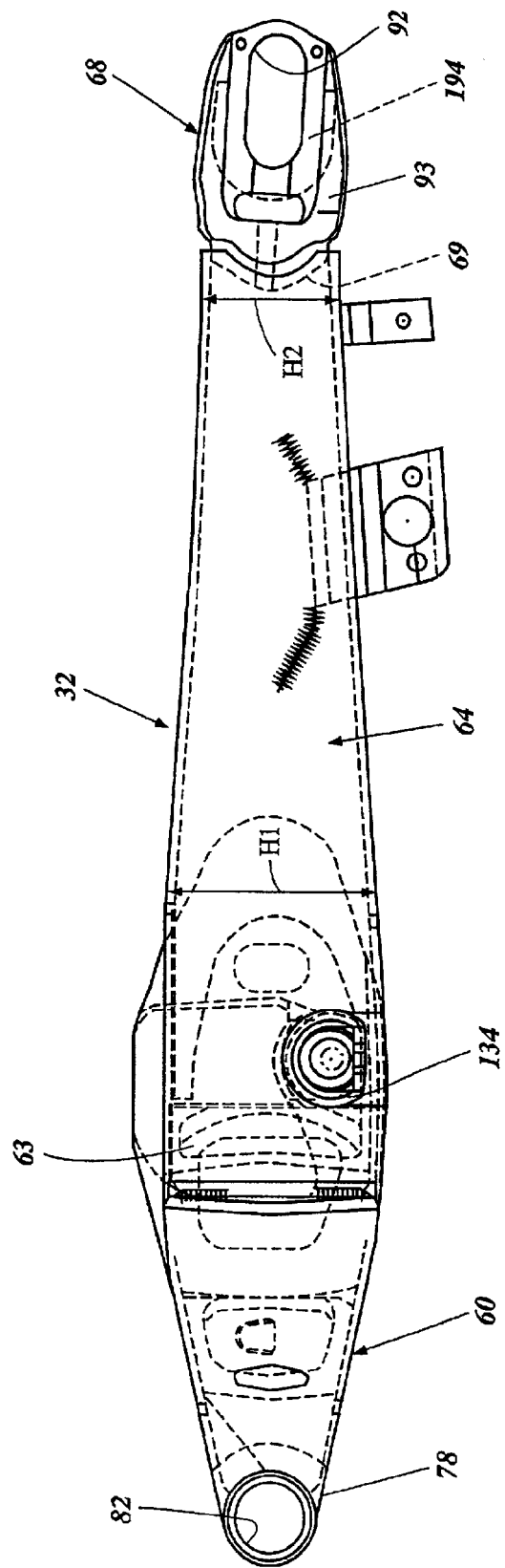
FIG. 3 is a left side view of the rear swingarm assembly of FIG. 2 viewed in a direction of the arrow 3 of FIG. 2.
Figure 4:
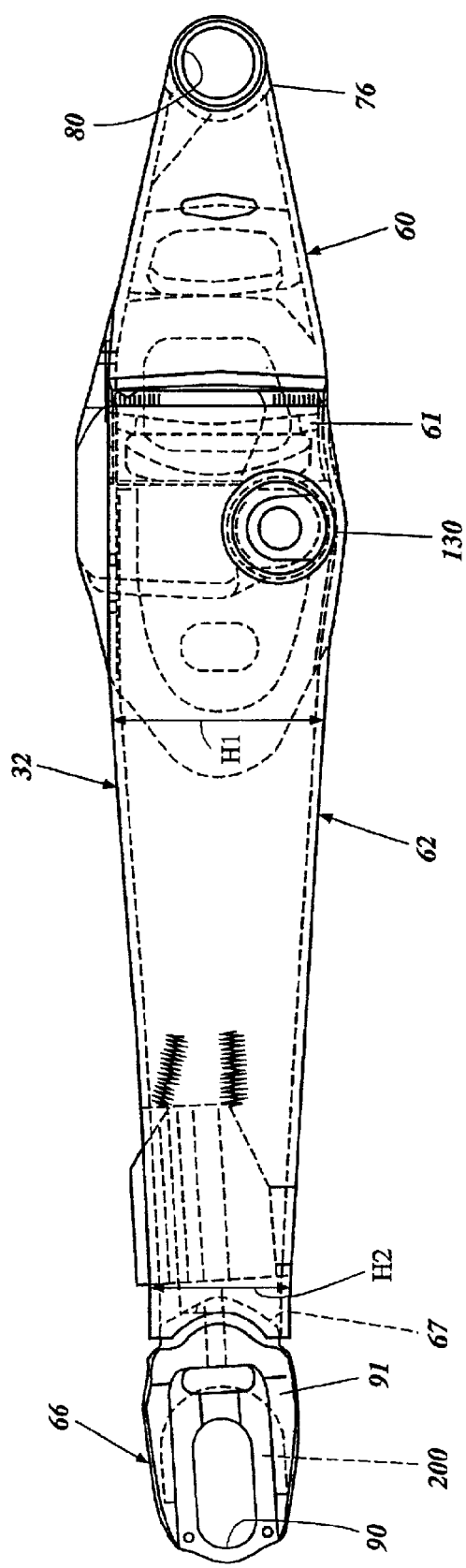
FIG. 4 is a right side view of the swingarm assembly of FIG. 2 as viewed in a direction of the arrow 4 of FIG. 2.

With reference to FIGS. 3 and 4, left and right sides, respectively, of the swingarm assembly 32 are shown. Preferably, each of the right and left arms 62, 64 define a first vertical dimension, or height H1, at a position approximately one-third of the length of the arms 62, 64 from the forward ends thereof. More preferably, the first vertical dimension H1 is disposed roughly adjacent to a juncture of the arms 62, 64 and the bridge member 84. Moreover, the height HI preferably is disposed in a region of the arms 62, 64 in which an opening is provided for an access member 130, 134, which are described below.

In addition, each of the arms 62, 64 preferably define a second vertical dimension, or height H2, near rearward ends of the arms 62, 64. Because greater strength is required near the middle portion, or intermediate region IR, of the swingarm assembly 32, the height H1 is desirably greater than the height H2. The height of the arms 62, 64 preferably gradually changes from H1 to H2 along the length of the arms 62, 64 such that stress localization can be reduced. Such an arrangement serves to improve the overall strength-to-weight ratio of the swingarm assembly 32 over prior arrangements.

Figure 8:
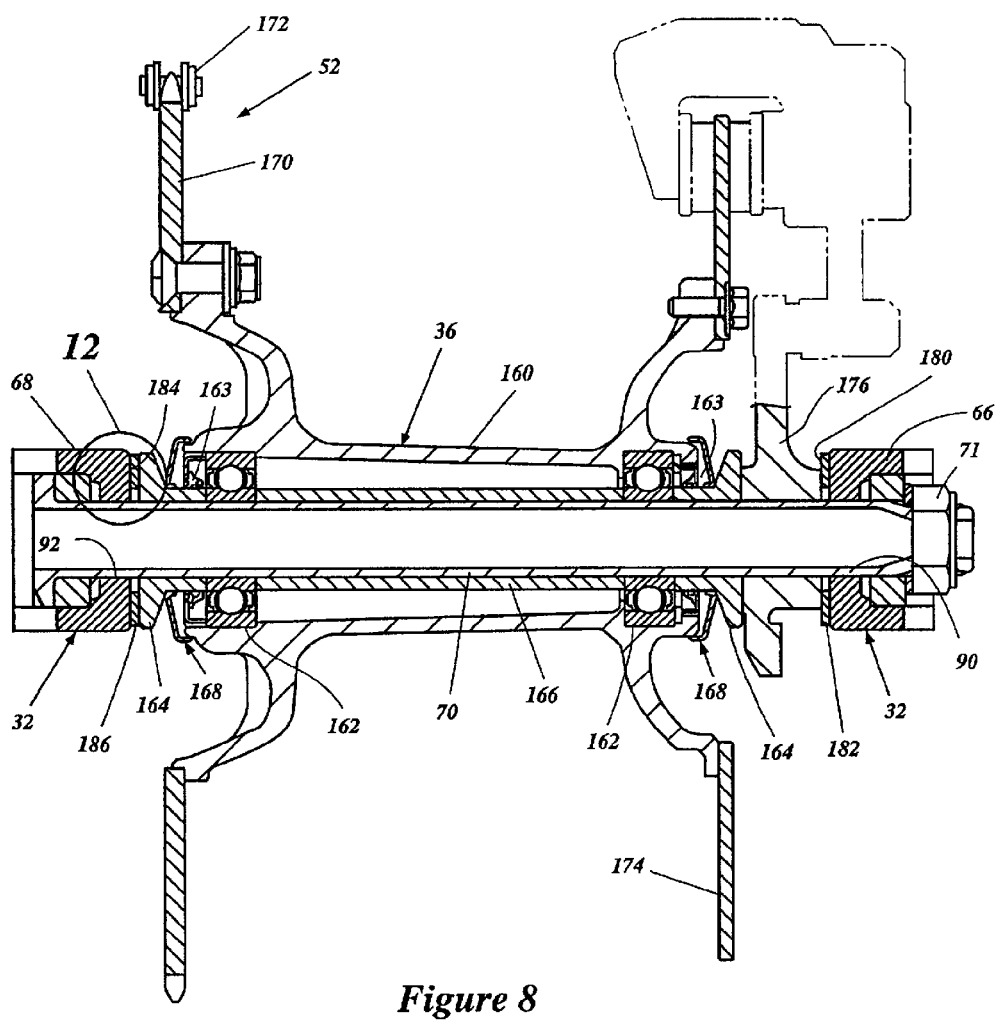
FIG. 8 is a cross-sectional view of a rear portion of the swingarm and a hub assembly associated with a rear wheel of the motorcycle of FIG. 1. The view is taken along the view line 8—8 of FIG. 1. A rear brake caliper is shown in phantom lines.

Each of the right and left wheel mount members 66, 68 define an aperture 90, 92, respectively, extending transversely therethrough. The apertures 90, 92 are elongated along the length of the swingarm 32 and are configured to receive the rear wheel axle 70 (FIG. 8). The elongated apertures 90, 92 permit the rear wheel 36 to be moved forward or rearward a limited distance, in a direction substantially parallel to the central plane CP, to permit the tension of the drive chain arrangement 52 to be adjusted, as is well known in the art.

A protruding wall 91 extends outward from the right wheel mount member 66 and a protruding wall 93 extends outward from the left wheel mount member 68. The walls 91, 93 extend in a generally C-shaped manner about the apertures 90, 92 respectively.

Figure 5:
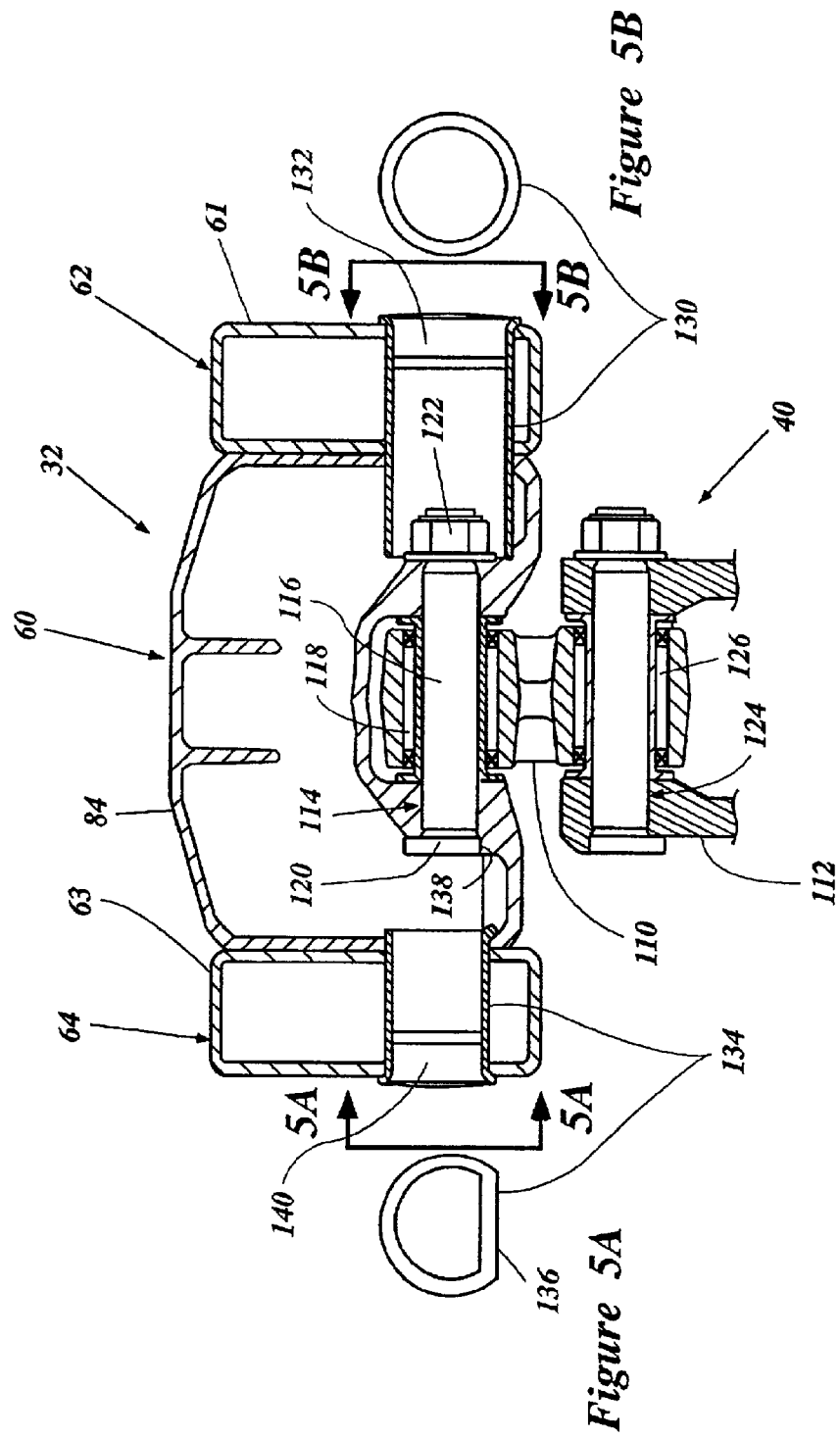
FIG. 5 is a cross-sectional view of the swingarm assembly of FIG. 2 taken along the view line 5—5 of FIG. 2.
Figure 6:
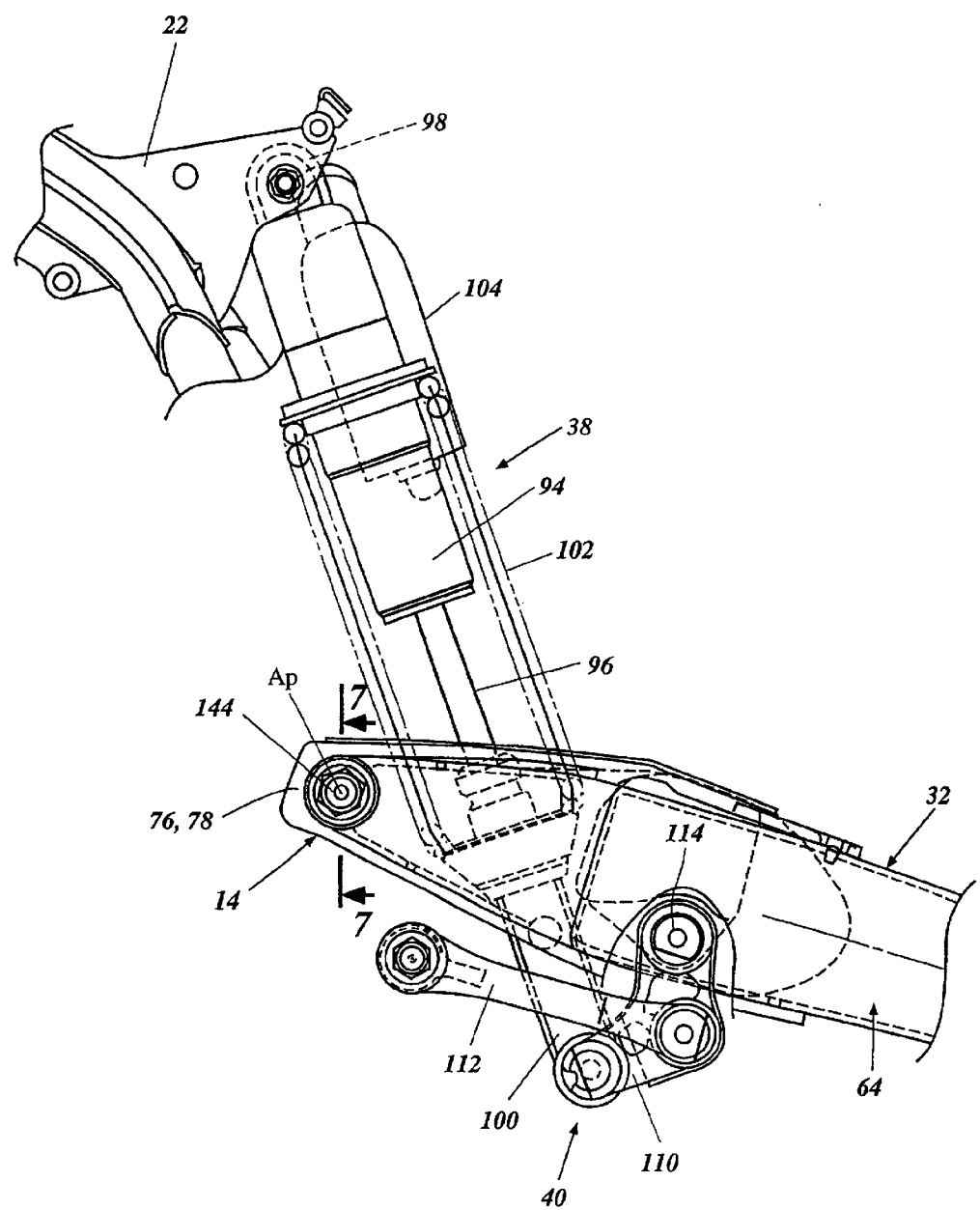
FIG. 6 is a side view of a forward portion of the swingarm assembly and a related portion of the motorcycle frame. An upper end of a rear shock absorber is connected to the motorcycle frame and a lower end of the rear shock absorber is connected to the swingarm assembly through a linkage arrangement.

With reference to FIGS. 5 and 6, the shock absorber 38 and linkage arrangement 40 is described in greater detail. As discussed previously, the rear shock absorber 38 desirably is connected to the swingarm assembly 32 through a linkage arrangement 40. In the illustrated arrangement, a lower portion of the shock absorber 38 is connected to the swingarm assembly 32 at a location generally between the forward portions 61, 63 of the right and left arms 62, 64. An upper portion of the shock absorber 38 is connected to the frame assembly 22.

The shock absorber 38 preferably is capable of providing both a spring force and a damping force to influence the articulating movement of the swingarm assembly 32 and, thus, the rear wheel 36. Desirably, the shock absorber includes a cylinder portion 94 and a rod portion 96. An upper end 98 of the cylinder portion 94 desirably is connected to the frame 22 of the motorcycle 20 while a lower end 100 of the rod portion 96 is connected to the linkage arrangement 40. A suspension spring 102 is operably positioned between the cylinder portion 94 and the rod portion 96 and provides a biasing force that tends to separate the cylinder portion 94 from the rod portion 96.

Preferably, a piston (not shown) is mounted to an upper end of the rod portion 96 and divides a fluid chamber (not shown) within the cylinder portion 94 into a compression chamber and a rebound chamber on opposite sides of the piston. A reservoir body 104 can be connected to the shock absorber 38 to define a reservoir chamber (not shown), which is in fluid communication with the compression chamber of the shock absorber 38. A floating piston may separate the reservoir chamber of the reservoir body 104 from a gas chamber, which exerts a pressure on the fluid within the reservoir chamber, as is well known in the art.

Upon compression motion of the shock absorber, a portion of the fluid within the compression chamber may move through a compression circuit of the shock absorber 38 while the remaining portion of the fluid compression chamber may move into the reservoir chamber. Upon rebound motion of the shock absorber 38, fluid moves through a rebound circuit of the shock absorber 38 from the rebound chamber back into the compression chamber. In addition, fluid from the reservoir chamber also returns to the compression chamber. Although such a shock absorber 38 is preferred, other suitable types of shock absorbers may also be used.

As described above, the lower end of the shock absorber 38 is connected to the swingarm assembly 32 through a linkage arrangement 40. Specifically, a generally "L-shaped" link member 110 is connected to the lower portion 100 of the shock absorber 38 at a first end and connected to the swingarm assembly 32 at a second end. A swing link member 112 is connected to a lower portion (not shown) of the motorcycle frame 22 at a first end and is connected to an intermediate portion of the link member 110 at its second end. Preferably, the swing link 112 is comprised of two arms (FIG. 5) positioned on either side of the lower end 100 of the shock absorber 38. However, other suitable swing link arrangements may also be used.

As illustrated in FIG. 5, desirably, an upper end of the link member 110 is connected to the swingarm assembly 32 and, specifically, to the bridge portion 84, by a bolt 114. The upper end extends up into a recess formed in the connecting portion 60 (i.e., the bridge portion 84) and is secured by the bolt 114. The bolt 114 includes a shaft portion 116, which rotatably supports the link member 110. Desirably, a bushing arrangement 118 is positioned between the link 110 and the shaft 116 of the bolt 114. However, a bearing arrangement, such as a needle bearing or roller bearing arrangement, may also be used. The bolt 114 includes a head portion 120 on one end, which has a larger diameter than the shaft portion 116. A nut 122 is threaded to the opposing end of the bolt 114 thereby securing the link 110 to the swingarm 32. While a bolt is illustrated, other suitable mechanical connections also can be used. Preferably, one side of the head portion 120 is flat to form a face that abuts a portion of the connecting portion 60 to keep the bolt 114 from rotating when installed.

Similarly, a bolt 124 secures the swing link 112 to the link member 110. Desirably, a bushing arrangement 126 is positioned between the bolt 124 and the link member 110, in a manner substantially similar to that described immediately above. In both cases, a set of seals preferably is positioned at the outer ends of the bushing arrangements 118, 126. The seals reduce the dust, dirt and grime that may wear the bushing arrangements 118, 126 prematurely.

A hollow, cylindrical access member 130 extends through the right arm 62 and a portion of the bridge 84 of the swingarm assembly 32 and defines a cavity which permits access to the nut 122. Desirably, the access member 130 is generally circular in cross section. Other suitable configurations also can be used. A plug 132, which may be made of rubber or a similar flexible material, desirably closes the outer end of the access member 130 to reduce the likelihood that water, dirt, dust and other foreign matter will enter the access member 130.

Similarly, an access member 134 passes through the left arm 64 and a portion of the bridge 84 of the swingarm assembly 32 to provide access to the head 120 of the bolt 114. However, the access member 134 desirably includes a flat along a portion of its perimeter, which cooperates with a corresponding flat 138 of the bolt head 120 to prevent the bolt 120 from turning relative to the swingarm 32. A plug member 140 is desirably positioned within the open end of the access member 134 to prevent water, dirt, dust and other foreign material from entering the access member 134.

The differentiated access members 130, 134 can assist a mechanic, operator or other person in locating the side with the removable nut 122 in the illustrated arrangement. In addition, by utilizing the access members 130, 134 the length of the bolt 114 could be reduced because the bolt did not have to extend completely through both of the arms 62, 64.

Figure 7:
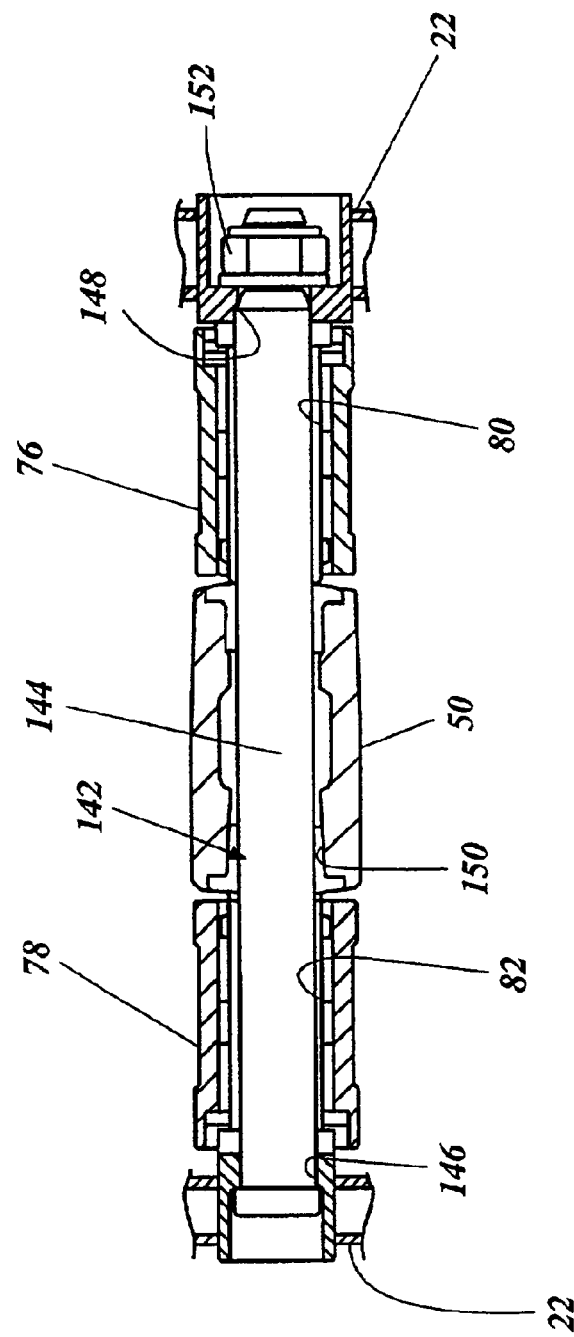
FIG. 7 is a cross-sectional view of a connection between a forward portion of the swingarm assembly and the motorcycle frame, taken along the view line 7—7 of FIG. 6.

With reference to FIG. 7, as described above, a forward end of the swingarm 32 is rotatably connected to the frame 22 of the motorcycle 20 to pivot about a pivot axis AP (FIG. 6). Specifically, a bolt 142 includes a shaft portion 144, which passes through apertures 146, 148 of the frame 22 and supports the portions 76, 78 of the swingarm 32. In addition, the shaft portion 144 of the bolt 142 additionally passes through an aperture 150 of a rearward end of a body portion of the engine 50. A nut 152 may be threaded to an end of the bolt 142 to secure it in place.

With reference to FIG. 8, a hub portion of the rear wheel 36 is shown in section. As described above, a rear axle 70 passes through the elongated apertures 90, 92 of the swingarm assembly 32 and rotatably supports the rear wheel 36. Specifically, a hub 160 is supported on the axle 70 by a pair of bearings 162 positioned near the outer ends of the hub 160. The illustrated bearings 162 are sealed bearing assemblies utilizing a plurality of individual ball bearing members. However, other suitable bearing arrangements may also be used. In the illustrated arrangement, a seal 163 is disposed on the outside of each of the bearings 162 to reduce the likelihood that water, dust, dirt and the like can work into the area between the hub portion of the rear wheel 36 and the rear axle 70.

A pair of outer spacers 164 space the bearings 162 from the right and left arms 66, 68, respectively, of the swingarm assembly 32 while an intermediate spacer 166 spaces the bearings 162 apart from one another. A pair of seal assemblies 168, which include the seals 163, inhibit water, dust, dirt, or other foreign material from coming into contact with the bearings 162.

The hub 160 supports a rear sprocket 170 of the chain drive arrangement 52, desirably near its left end. A roller-type chain 172 engages teeth on the sprocket 170 to drive the rear wheel 36 in a manner well known in the art. Near its right end, the hub 160 supports a disc brake rotor 174 such that the disc brake rotor 174 will rotate with the rear wheel 36. A rear brake caliper 176 (FIG. 8, shown in phantom lines) is supported by the swingarm 32 and is configured to selectively engage the rotor 174 to impart a stopping force on the rear wheel 36, as is well known in the art. As can be appreciated, the rotor 174 and the sprocket 170 can be reversed relative to each other and, in some applications, can be positioned on the same side of the wheel, if desired.

The right wheel mount member 66 of the swingarm assembly 32 defines an inner, generally planar surface 180.

Preferably, an intermediate member, such as washer 182, is positioned between the surface 180 and the brake caliper 176. The intermediate member 182 assists in inhibiting damage to the surface 180 during operation of the motorcycle 20.

Similarly, the left wheel mount member 68 of the swingarm assembly 32 defines an inner, generally planar surface 184. An intermediate member, such as washer 186, desirably is positioned between the surface 184 and the spacer 164 to inhibit damage to the surface 184. The wheel mount members 66, 68 are described in greater detail below.

With reference to FIG. 2, as described above, the width of the arms 62, 64 of the swingarm assembly 32 vary along the length of the arms 62, 64 to optimize the strength to weight ratio of the swingarm assembly 32. Advantageously, the arms 62, 64 define a width W1 in a central portion thereof which is greater than a width W2, W3 of either end of the arms 62, 64. Such an arrangement allows the swingarm 32 to resist deflection at its central portion, where loads are the greatest, while maintaining a relatively low weight. The central portion with the width W1 preferably is just rearward of the location at which the arms 62, 64 are coupled to the coupling member 60. The widths preferably gradually change from W2 to W1 to W3 along the length of the arms. The gradual change in widths reduces stress localizing that can occur at drastic changes in width.

Desirably, the arms 62, 64 are formed to their final shape and size, at least in part, by a hydroforming process. In such a process, the arms 62, 64 are initially elongated tubular members, or workpieces, having an elliptical cross-section. The workpieces are cut to approximately their final length and are bent into approximately their final shape. The tubular member is then placed within a die cavity having an interior surface sized and shaped in the desired final size and shape of the outer surface of the arm members 62, 64. The die is closed and a bladder is placed within the center of the tubular workpiece. Fluid is then introduced into the bladder and pressurized to a level sufficient to expand the workpiece until it conforms to the internal surface of the die cavity, thus forming the final shape of the arms 62, 64.

Such an arrangement permits the arm members 62, 64 to be constructed with a width W2, W3 at the ends thereof to be less than a width W1 of the central portion of the arms 62, 64. This is because, once deflated, the bladder can be easily removed from the arm members 62, 64, unlike the solid internal die used in a swaging process.

In addition, such a method of construction allows the inner surfaces 62A, 62B of the arms 62, 64 to remain vertical and substantially planar along their length and especially at the intermediate region IR wherein the arms 62, 64 are bent inward. As described above, with conventional manufacturing methods the bent portions of the arms 62, 64 are deformed upon manufacture into a vertical concave shape (i.e., the center portion of the inside vertical face caves inward), which compromises the strength and stiffness of the arms and requires more material to be added in order to provide the desired amount of strength and stiffness. This results in a heavier swingarm assembly.

Figure 9:
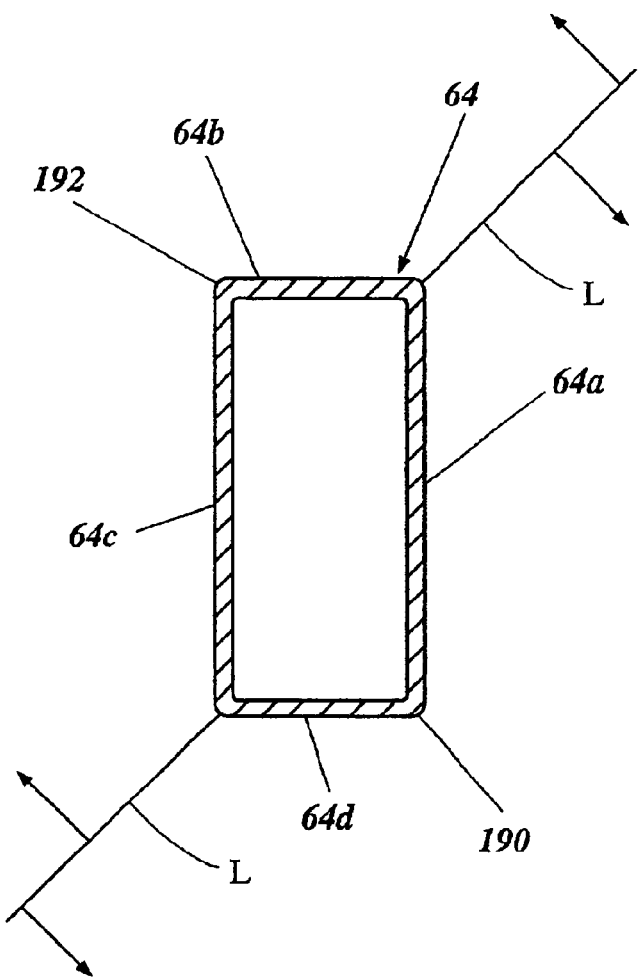
FIG. 9 is a schematic view of a preferred mold arrangement for use in producing the arms of the swingarm assembly of FIG. 2.

With reference to FIG. 9, the left arm 64 of the swingarm assembly 32 is shown in section with a desired, general location of a parting line L of the hydroforming die illustrated schematically. As illustrated, desirably the hydroforming die is configured such that the two halves of the die separate along the parting line L, which extends at approximately a 45-degree angle from a vertical plane defined by the inner surface 64a. In addition, the parting line L desirably extends from an upper, inside corner of the arm 64 (i.e., an intersection of the inner surface 64a and upper surface 64b) and, on the opposing side of the arm 64, extends from a lower, outside corner (i.e., an intersection of the outer surface 64c and lower surface 64d).

Such an arrangement permits an upper, outer corner 192 and a lower, inner corner 190 of the arm 64 to have a continuously rounded surface. In contrast, the other two corners of the arm 64 from which the parting line L extends may have a surface imperfection along the line L where the two halves of the hydroforming die meet. The stresses in the arm 64 undesirably concentrate at such an imperfection. With the illustrated arrangement, the corner 190 subjected the greatest amount of stress and the corner 192 that is most readily visible when the arm 64 is assembled to the motorcycle 20 are free from surface imperfections to both improved the strength and improve the appearance of the arm 64.

Figure 10:
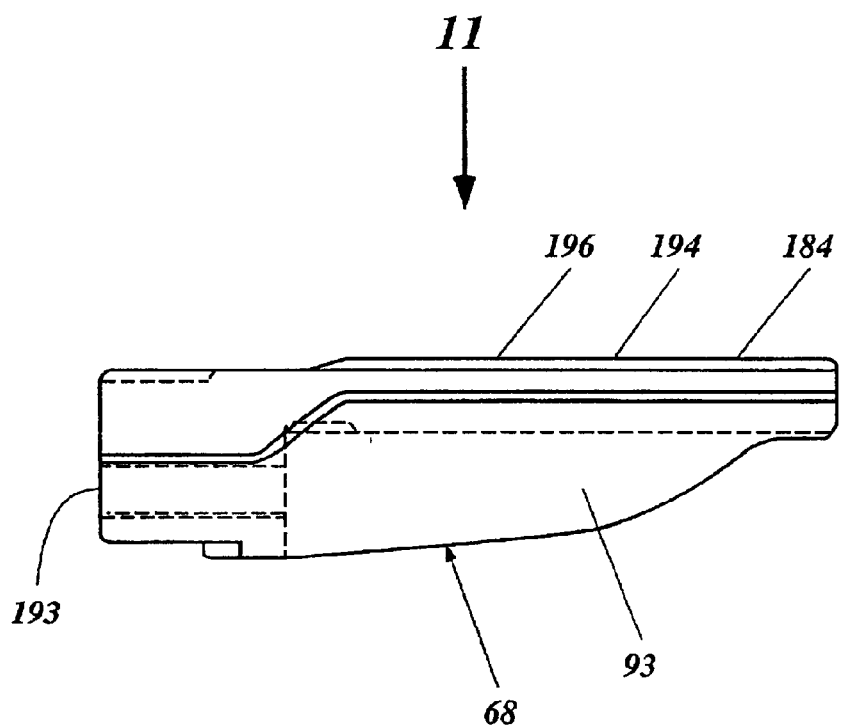
FIG. 10 is a top plan view of the left wheel mount member of the rear swingarm assembly of FIG. 2 incorporating a vibration absorbing coating.
Figure 11:
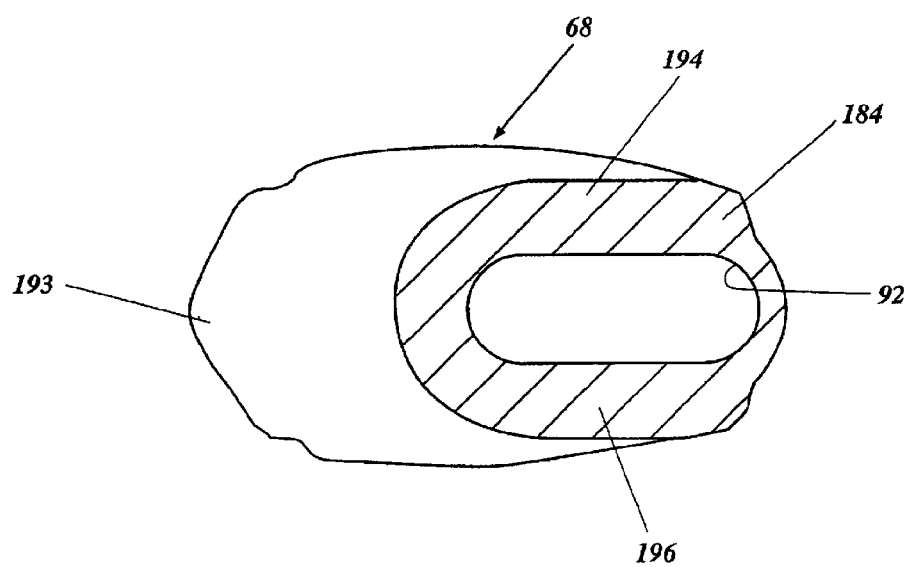
FIG. 11 is a side view of the left wheel mount member taken in a direction of the arrow 11 of FIG. 10.
Figure 12:
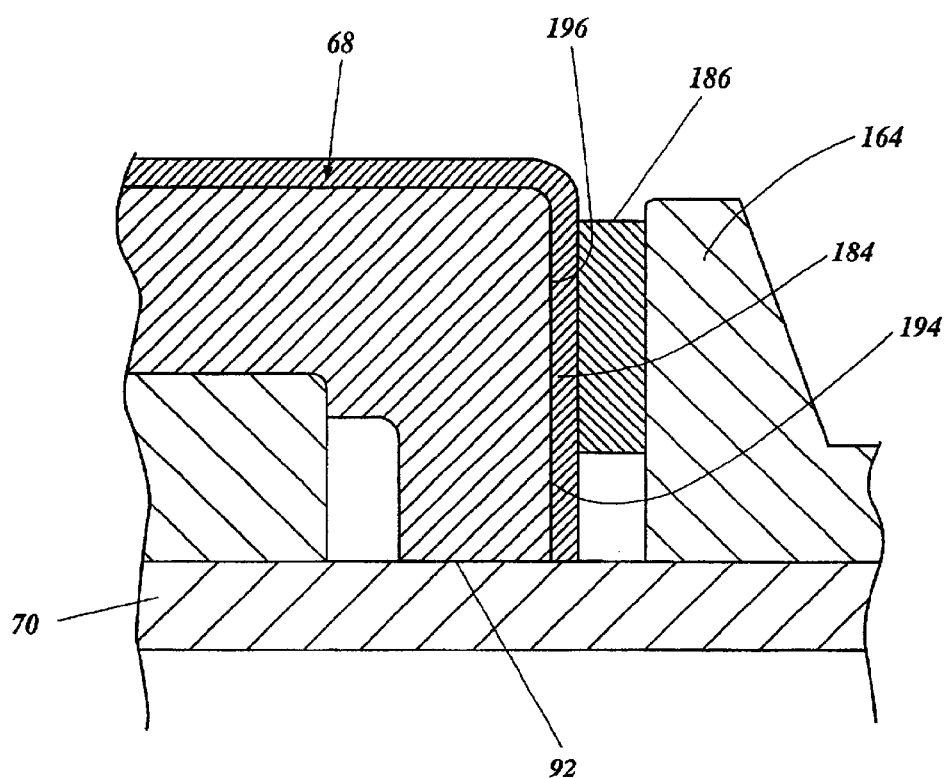
FIG. 12 is an enlarged view of a portion of the left side of the rear swingarm assembly and rear wheel hub assembly indicated by the view line 12 of FIG. 8, which view illustrates the vibration absorbing coating.
Figure 13:
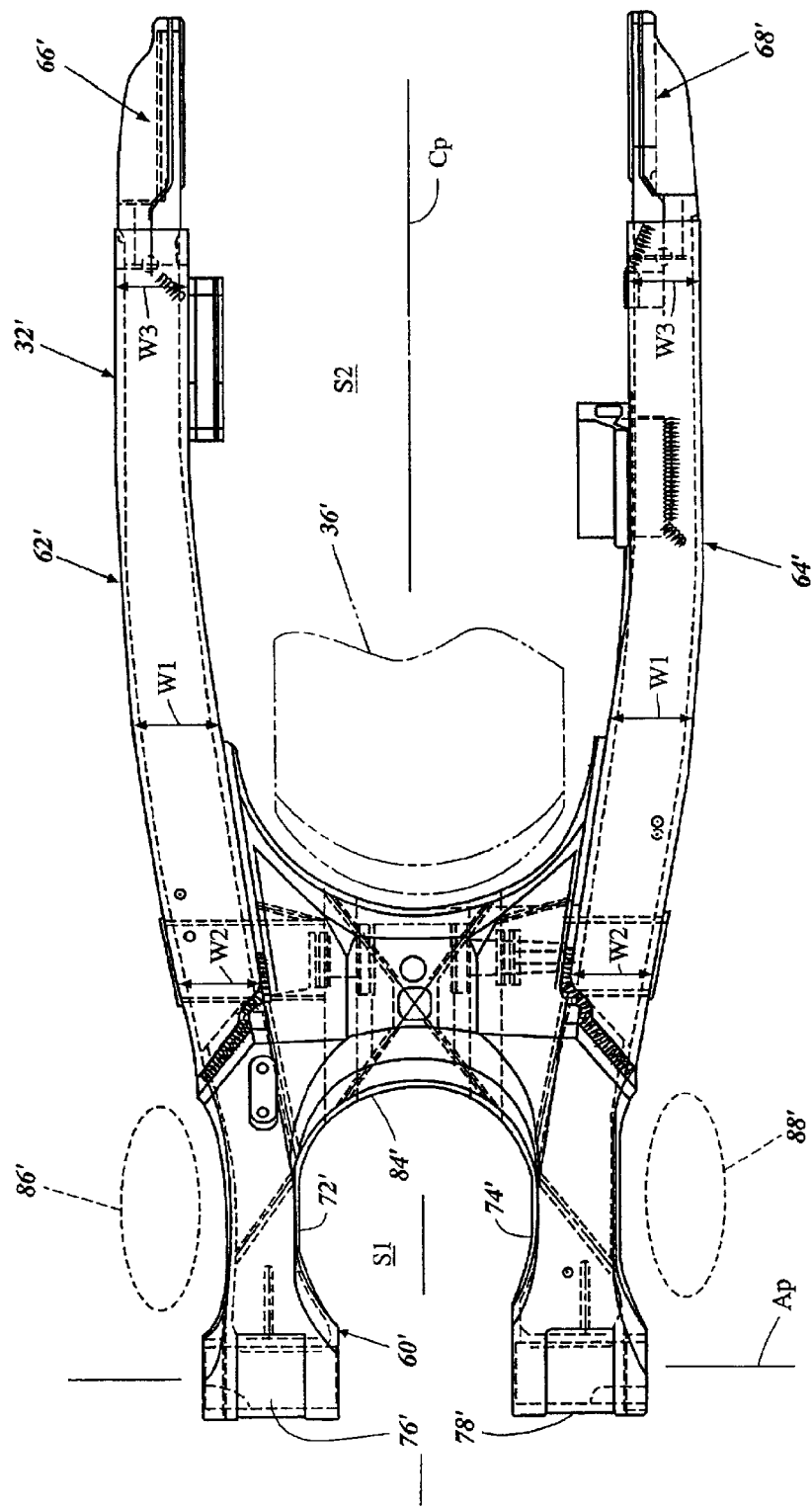
FIG. 13 is a top plan view of a modification of the swingarm assembly of FIG. 2.

With reference to FIGS. 10 through 12, the left wheel mount member 68 is illustrated in greater detail. Although not separately illustrated, the right wheel support member 66 is desirably constructed in a manner substantially similar to that described below in relation to the left wheel support member 68.

Desirably, a forward end 193 of the wheel support member 68 is sized and shaped to fit within an open, rearward end of the arm 64. Preferably, the wheel support member 68 is welded to the arm 64 to secure it in place. However, other suitable constructions and arrangements may also be used. For example, the wheel support member 68 may be formed from the same piece of material as the arm 64. Alternatively, threaded fasteners, or the like, may be used to secure the wheel support member 68 to the arm 64.

Desirably, the wheel support member 68 includes a protruding reinforcement portion 194 substantially annular in shape and surrounding the elongated aperture 92. The reinforcement portion 194 forms a portion of the inner surface 184 of the wheel support member 68 and, desirably, is sized and shaped to contact the washer 186 when the axle 70 and rear wheel 36 is at any position within the elongated aperture 92. With such an arrangement, the reinforcement portion 194 creates a thickened wall portion of the wheel mount 68 to better withstand forces applied to the mount member 68 while simultaneously maintaining a low weight.

With reference to FIG. 12, desirably, the wheel support member 68 includes a coating 196, which is interposed between the contact surface 184 and the washer 186. The coating 196 can comprise a solid lubricant, such as molybdenum disulphide system fluororesin. The coating 196 may also comprise either a lubricant or a vibration absorbing material, such as rubber or an elastomeric material, or both, and preferably covers at least the reinforcement portion 194. The coating layer 196 preferably is about 35+/−5 $\mu$m in regions that contact other components and about 15 $\mu$m elsewhere. Alternatively, however, the entire wheel support member 68 may be coated. In such arrangements, the remainder of the swingarm assembly 32 preferably is processed with a surface treatment, such as an anodized or aluminum anodic coating, such as ALUMITE. Further, in some arrangements, it may be desirable to coat the entire swingarm assembly 32 with the vibration absorbing material 196. In one configuration, the washer 186 is coated rather than the reinforcement portion 194 because the washer can be more readily replaced when the coating is worn away.

With such an arrangement, vibration between the washer 186 and the wheel support member 68 is absorbed by the coating 196 and prevents damage to the surface of the wheel support member 68 that would otherwise occur due to relative motion therebetween. Accordingly, such an arrangement provides the swingarm assembly 32 with a longer usable life.

FIGS. 13 through 19 illustrate a modification of the swingarm assembly 32 of FIGS. 1 through 12 and is referred to generally by the reference numeral 32'. The swingarm assembly 32' is substantially similar to the swingarm assembly 32 described above and, therefore, like reference numerals will be used to describe like components except for a prime (') that has been added.

Figure 14:
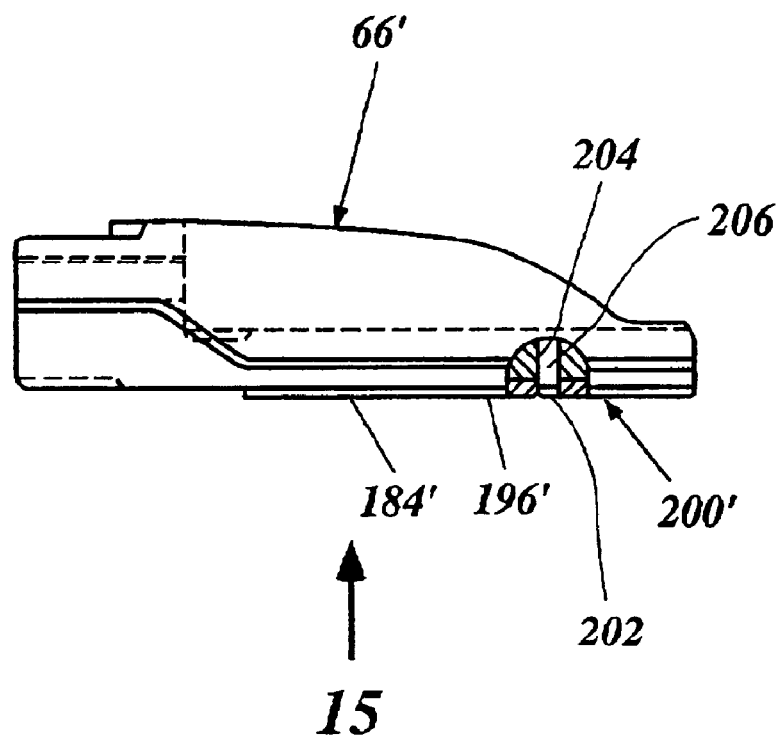
FIG. 14 is a top plan view of a right rear wheel mount member of the swingarm of FIG. 13 incorporating a vibration absorbing member.
Figure 15:
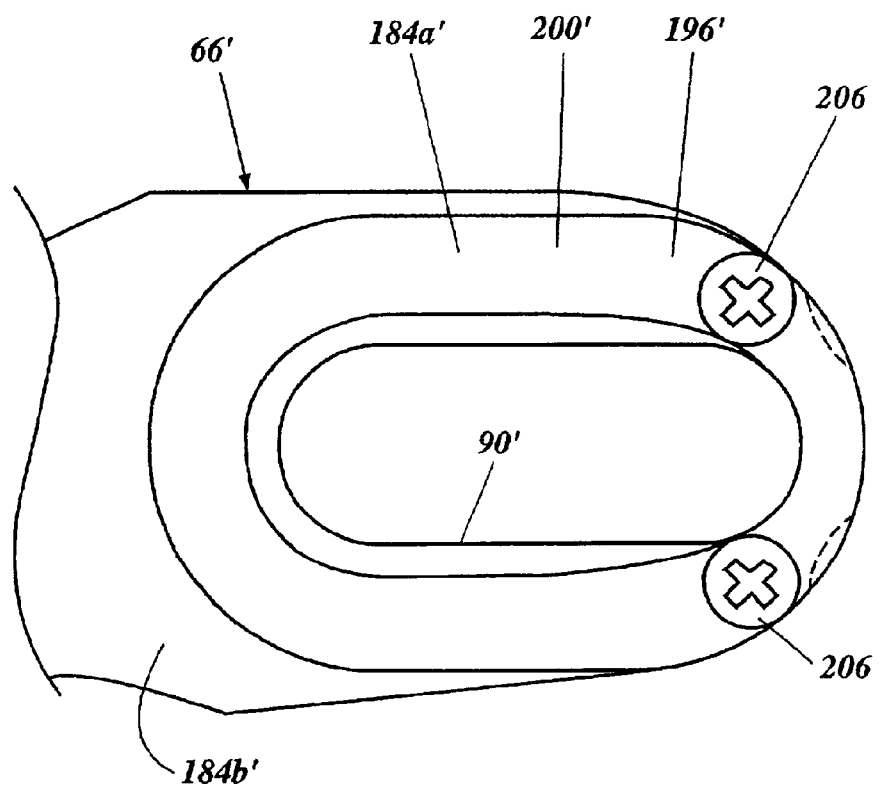
FIG. 15 is a side view of an inner side of the right rear wheel mount member taken in a direction of the arrow 15 of FIG. 14.
Figure 16:
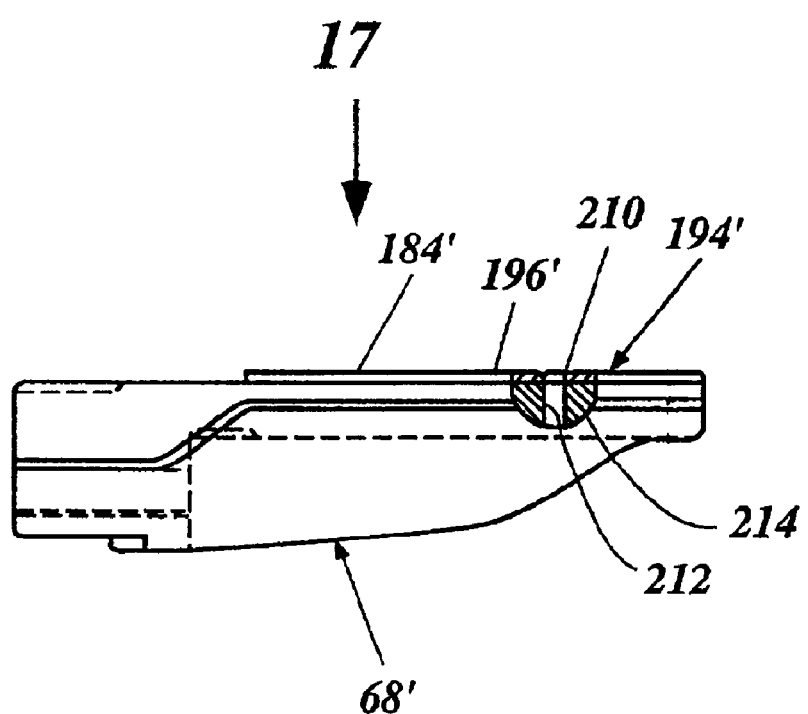
FIG. 16 is a top plan view of a left side rear wheel mount member of the swingarm assembly of FIG. 13 incorporating a vibration absorbing member.
Figure 17:
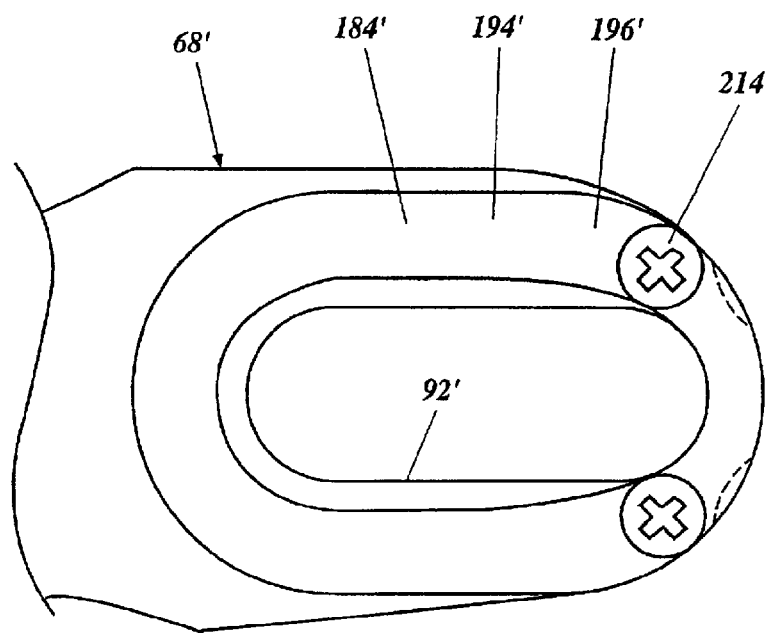
FIG. 17 is a side view of an inner side of the left rear wheel mount member taken in a direction of the arrow 17 of FIG. 16.
Figure 18:
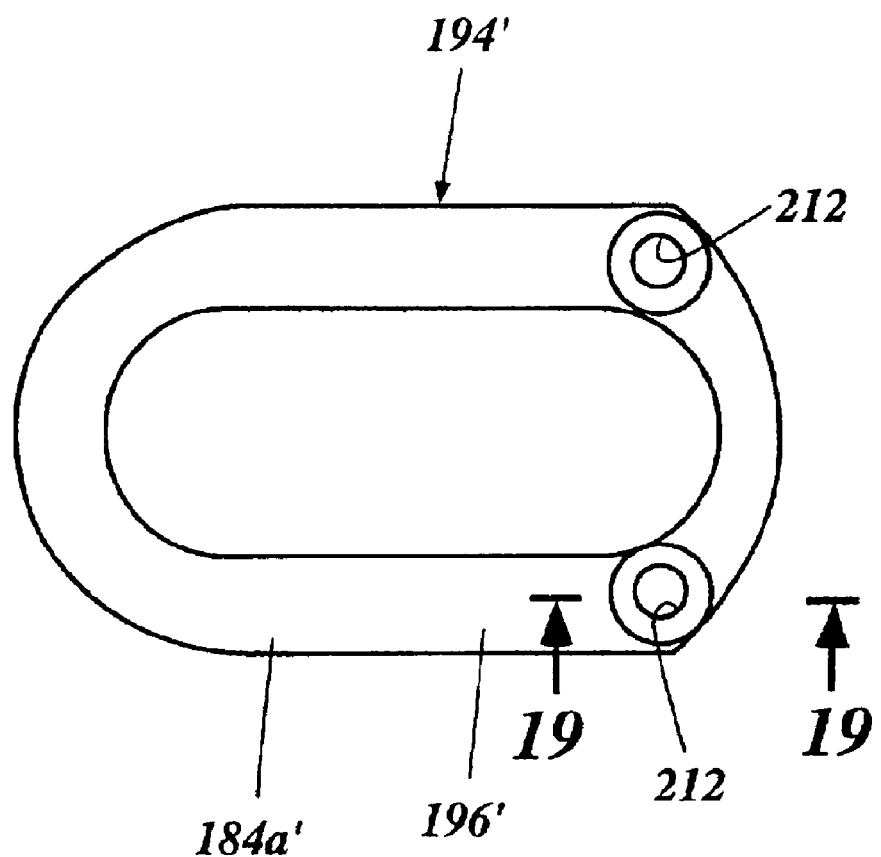
FIG. 18 is a side view of the vibration absorbing member of FIG. 16.
Figure 19:
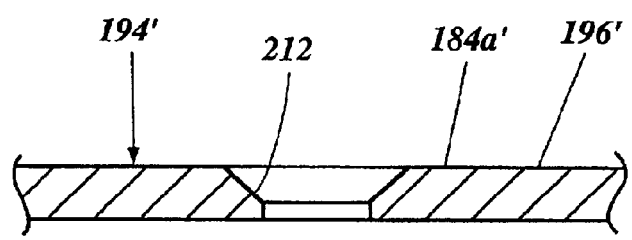
FIG. 19 is a partial cross-sectional view of the vibration absorbing member taken along the view line 19—19 of FIG. 18.

As illustrated in FIGS. 14 and 15, the modified rear wheel support member 66' includes a reinforcement portion 200' that, desirably, is constructed from a separate piece of material from the remainder of the support member 66' and, when assembled, forms a portion 184a' (FIG. 15) of the inner surface 184' that is in contact with the washer 186. Such an arrangement permits the reinforcement portion 200' to be coated with a vibration absorbing material, as described above, separately from the remainder of the wheel support member 66'. Thus, manufacturing is simplified and, if necessary, the reinforcement portion 200' may be easily replaced.

With reference to FIG. 14, desirably, the reinforcement portion 200' is received within a recess formed by an inner surface of the support member 66'. That is, only approximately one-half of the thickness of the reinforcement portion 200' is exposed beyond the inner surface 184b' (FIG. 15) surrounding the reinforcement portion 200'. Such an arrangement permits the reinforcement portion 200' to be securely held in a desired position with a minimum of fasteners.

Preferably, at least a rearward end of the reinforcement portion 200' is fixed to the wheel support member 66' by one or more fasteners. Desirably, the reinforcement portion 200' includes a pair of countersunk apertures 202 (only one shown), which cooperate with a pair of threaded apertures 204 (only one shown) of the wheel support member 66' to receive a pair of threaded fasteners 206 to secure the reinforcement portion 200' to the wheel support member 66'.

With reference to FIGS. 16 through 19, the left wheel support portion 68' desirably also includes a separate reinforcement portion 194' secured thereto. The left reinforcement portion 194', desirably, is constructed substantially identically to the reinforcement portion 200' described immediately above. Thus, the reinforcement portion 194' is received within a recess of the wheel support portion 68' and also includes a pair of countersunk apertures 210 which cooperate with a pair of threaded apertures 212 to receive a threaded fastener 214 and thereby secure the reinforcement portion 194' to the wheel support member 68'.

Although the present invention has been described in the context of preferred embodiments, it is not intended to limit the invention to the provided example. Modifications to the above-described swingarm assembly apparent to one of skilled in the art are considered to be part of the present invention. Accordingly, the invention should be defined solely by the appended claims.

What is claimed is:

1. An off-road motorcycle comprising a frame, a front suspension assembly rotatably supported by the frame and rotatably supporting a front wheel, a rear swingarm assembly pivotably supported by the frame and rotatably supporting a rear wheel, an internal combustion engine supported by the frame and being configured to drive the rear wheel, the swingarm assembly comprising at least one elongated, tubular arm extending along a side of the rear wheel in a direction substantially aligned with a vertical, central plane of the motorcycle, the swingarm assembly having a rearward end portion member mounted to the tubular arm and arranged to receive an axle, the axle being configured to support a hub assembly of the rear wheel, the end portion having an inner surface facing the hub assembly, the inner surface having a first portion and a second portion, the second portion defining a contact surface arranged to directly contact a portion of the hub assembly and being spaced from the first portion toward the hub assembly to define a thickened area of the end portion, which is thicker than a thinner area defined by the first portion.

2. An off-road motorcycle comprising a frame, a front suspension assembly rotatably supported by the frame and rotatably supporting a front wheel, a rear swingarm assembly pivotably supported by the frame and rotatably supporting a rear wheel, an internal combustion engine supported by the frame and being configured to drive the rear wheel, the swingarm assembly comprising at least one elongated, tubular arm extending along a side of the rear wheel in a direction substantially aligned with a vertical, central plane of the motorcycle, the arm having a rearward end portion arranged to receive an axle, the axle being configured to support a hub assembly of the rear wheel, the end portion having an inner surface facing the hub assembly, the inner surface having a first portion and a second portion, the second portion defining a contact surface arranged to contact a portion of the hub assembly and being spaced from the first portion toward the hub assembly to define a thickened area of the end portion, wherein the contact surface comprises a dry lubricant material.

3. The motorcycle of claim 2, wherein a remainder of the swingarm assembly is coated with an aluminum anodic coating.

4. The motorcycle of claim 1, additionally comprising an annular member fixed to an inner surface of the end portion, the annular member defining the second portion of the inner surface.

5. An off-road motorcycle comprising a frame, a front suspension assembly rotatably supported by the frame and rotatably supporting a front wheel, a rear swingarm assembly pivotably supported by the frame and rotatably supporting a rear wheel, an internal combustion engine supported by the frame and being configured to drive the rear wheel, the swingarm assembly comprising at least one elongated, tubular arm extending along a side of the rear wheel in a direction substantially aligned with a vertical, central plane of the motorcycle, the arm having a rearward end portion arranged to receive an axle, the axle being configured to support a hub assembly of the rear wheel, the end portion having an inner surface facing the hub assembly, the inner surface having a first portion and a second portion, the second portion defining a contact surface arranged to contact a portion of the hub assembly and being spaced from the first portion toward the hub assembly to define a thickened area of the end portion, additionally comprising an annular member fixed to an inner surface of the end portion, the annular member defining the second portion of the inner surface, wherein the contact surface comprises a dry lubricant material.

6. The motorcycle of claim 5, wherein a remainder of the swingarm assembly is coated with an aluminum anodic coating.

7. An off-road motorcycle comprising a frame, a front suspension assembly rotatably supported by the frame and rotatably supporting a front wheel, a rear swingarm assembly pivotably supported by the frame and rotatably supporting a rear wheel, an internal combustion engine supported by the frame and being configured to drive the rear wheel, the swingarm assembly comprising at least one elongated, tubular arm extending along a side of the rear wheel in a direction substantially aligned with a vertical, central plane of the motorcycle, the arm having a rearward end portion arranged to receive an axle, the axle being configured to support a hub assembly of the rear wheel, the end portion having an inner surface facing the hub assembly, wherein a portion of the inner surface contacting the hub comprises a lubricious layer.

8. The off-road motorcycle of claim 7, wherein the at least one arm comprises a first arm and a second arm, the first and second arms being positioned on opposing sides of the rear wheel.

9. The motorcycle of claim 7, wherein a remainder of the swingarm assembly is coated with an aluminum anodic coating.

10. A rear suspension swingarm assembly for an off-road motorcycle, the swingarm assembly configured to be pivotably supported by a frame of the motorcycle and rotatably supporting a rear wheel of the motorcycle, the swingarm assembly comprising a connecting portion defining a pivot axis of the swingarm assembly relative to the frame of the motorcycle, the swingarm assembly additionally comprising a first elongated, tubular arm and a second elongated, tubular arm, each of the first and second arms being fixed to the connecting portion and extending along a side of the rear wheel, first and second rearward end portion members mounted to the first and second tubular arms respectively and arranged to receive an axle, the axle being configured to support a hub of the rear wheel, each end portion member having an inner surface facing the hub, the inner surface having a first thinner portion facing the hub and a second thickened portion directly contacting the hub and extending from the first thinner portion toward the hub assembly.

11. A rear suspension swingarm assembly for an off-road motorcycle, the swingarm assembly configured to be pivotably supported by a frame of the motorcycle and rotatably supporting a rear wheel of the motorcycle, the swingarm assembly comprising a connecting portion defining a pivot axis of the swingarm assembly relative to the frame of the motorcycle, the swingarm assembly additionally comprising a first elongated, tubular arm and a second elongated, tubular arm, each of the first and second arms being fixed to the connecting portion and extending along a side of the rear wheel, each of the arms having a rearward end portion arranged to receive an axle, the axle being configured to support a hub assembly of the rear wheel, the end portion having an inner surface facing the hub assembly, the inner surface having a thickened portion extending toward the hub assembly, wherein the thickened portion comprises a contact surface having a lubricious layer.

12. The swingarm assembly of claim 11, wherein a remainder of the swingarm assembly is coated with an aluminum anodic coating.

13. The swingarm assembly of claim 10, additionally comprising an annular member fixed to an inner surface of the end portion, the annular member defining the thickened portion of the inner surface.

14. A rear suspension swingarm assembly for an off-road motorcycle, the swingarm assembly configured to be pivotably supported by a frame of the motorcycle and rotatably supporting a rear wheel of the motorcycle, the swingarm assembly comprising a connecting portion defining a pivot axis of the swingarm assembly relative to the frame of the motorcycle, the swingarm assembly additionally comprising a first elongated, tubular arm and a second elongated, tubular arm, each of the first and second arms being fixed to the connecting portion and extending along a side of the rear wheel, each of the arms having a rearward end portion arranged to receive an axle, the axle being configured to support a hub assembly of the rear wheel, the end portion having an inner surface facing the hub assembly, the inner surface having a thickened portion extending toward the hub assembly, additionally comprising an annular member fixed to an inner surface of the end portion, the annular member defining the thickened portion of the inner surface, wherein the contact surface comprises a vibration absorbing material.

15. The swingarm assembly of claim 14, wherein a remainder of the swingarm assembly is coated with an aluminum anodic coating.

16. A rear suspension swingarm assembly for an off-road motorcycle, the swingarm assembly configured to be pivotably supported by a frame of the motorcycle and rotatably supporting a rear wheel of the motorcycle, the swingarm assembly comprising a connecting portion defining a pivot axis of the swingarm assembly relative to the frame of the motorcycle, the swingarm assembly additionally comprising a first elongated, tubular arm and a second elongated, tubular arm, the first and second arms being fixed to the connecting portion and extending along a side of the rear wheel, each of the arms having a rearward end portion arranged to receive an axle, the axle being configured to support a hub assembly of the rear wheel, the end portion having an inner surface facing the hub assembly, wherein a portion of the inner surface contacting the hub comprises a vibration absorbing coating.

17. The swingarm assembly of claim 16, wherein the first and second arms are positioned on opposing sides of the rear wheel.

18. The swingarm assembly of claim 16, wherein a remainder of the swingarm assembly is coated with an aluminum anodic coating.

19. A rear suspension swingarm assembly for an off-road motorcycle, the swingarm assembly configured to be pivotably supported by a frame of the motorcycle and rotatably supporting a rear wheel of the motorcycle, the swingarm assembly comprising a connecting portion defining a pivot axis of the swingarm assembly relative to the frame of the motorcycle, the swingarm assembly additionally comprising a first elongated arm and a second elongated arm, each of the first and second arms being fixed to the connecting portion and extending along a side of the rear wheel, each of the arms having a rearward end portion with an aperture arranged to receive an axle, the axle being configured to support a hub of the rear wheel, the end portion having an inner surface facing the hub, the inner surface having a first area extending around the aperture and defining a hub contact area configured to directly contact the hub, and a second area immediately adjacent to the first area, the second area being recessed away from the hub relative to the first area such that the first area projects inwardly from the second area toward the hub.

20. The rear suspension swingarm assembly as set forth in claim 19, wherein the first area defines a thickened area of the end portion that is thicker than the second area.

21. The rear suspension swingarm assembly as set forth in claim 19, wherein the first area extends completely around a periphery of the aperture.

22. The rear suspension swingarm assembly as set forth in claim 19, wherein the first area is annular in shape.

23. The rear suspension swingarm assembly as set forth in claim 19, wherein the first area defines a first planar area lying in a first plane and the second area defines a second planar area lying in a second plane, the first plane being disposed closer to the hub than the second plane.

* * * * *